(12) United States Patent
Han

(10) Patent No.: US 9,965,238 B2
(45) Date of Patent: May 8, 2018

(54) METHOD AND APPARATUS FOR SHARING DISPLAY FRAME

(71) Applicant: Wistron Corporation, New Taipei (TW)

(72) Inventor: Yen-Kang Han, New Taipei (TW)

(73) Assignee: Wistron Corporation, New Taipei (TW)

( * ) Notice: Subject to any disclaimer, the term of this patent is extended or adjusted under 35 U.S.C. 154(b) by 29 days.

(21) Appl. No.: 14/499,255

(22) Filed: Sep. 29, 2014

(65) Prior Publication Data

US 2015/0378665 A1    Dec. 31, 2015

(30) Foreign Application Priority Data

Jun. 30, 2014 (TW) .............................. 103122530 A

(51) Int. Cl.
*G06F 3/14* (2006.01)
*H04L 12/18* (2006.01)
(Continued)

(52) U.S. Cl.
CPC ........ *G06F 3/1462* (2013.01); *G06F 3/04886* (2013.01); *G06F 3/1454* (2013.01);
(Continued)

(58) Field of Classification Search
CPC ............... G06F 3/1454; G06F 3/04842; G06F 3/04886; G06F 3/1462; G06F 2203/04803;
(Continued)

(56) References Cited

U.S. PATENT DOCUMENTS 7,587,534 B2 * 9/2009 Liu .......................... G06F 3/023
345/2.1
8,458,255 B2 * 6/2013 Takeuchi ........... H04N 1/00183
709/204
(Continued)

FOREIGN PATENT DOCUMENTS

| CN | 101261550 | 9/2008 |
| CN | 100533357 | 8/2009 |

(Continued)

OTHER PUBLICATIONS

"Office Action of Taiwan Counterpart Application with partial English translation", dated Dec. 29, 2015, p. 1-p. 13, in which the listed reference was cited.
(Continued)

*Primary Examiner* — Dismery Mercedes
(74) *Attorney, Agent, or Firm* — JCIPRNET

(57) ABSTRACT

A method and an apparatus for sharing display frame are provided. The apparatus includes a display unit, a communication unit, and a processing unit. In the method, a plurality of electronic apparatuses are searched by the processing unit through the communication unit, where each of the electronic apparatuses is configured to display a corresponding display frame. The processing unit selects one or a plurality of the electronic apparatuses, and synchronously displays at least first frame displayed by the display unit on one or a plurality of the selected electronic apparatus.

12 Claims, 6 Drawing Sheets

(51) Int. Cl.
*H04L 29/06* (2006.01)
*H04N 21/41* (2011.01)
*G06F 3/0488* (2013.01)
*H04N 21/43* (2011.01)
*H04N 21/422* (2011.01)

(52) U.S. Cl.
CPC ........ *H04L 12/1822* (2013.01); *H04L 65/403* (2013.01); *H04L 65/4007* (2013.01); *H04L 65/4015* (2013.01); *H04N 21/4126* (2013.01); *H04N 21/42207* (2013.01); *H04N 21/4302* (2013.01); *G06F 2203/04803* (2013.01)

(58) Field of Classification Search
CPC ..... G06F 9/4445; G06F 1/1647; H04L 67/10; H04L 67/22; H04L 67/025; H04L 65/403; H04L 65/4015; H04L 12/1822; H04L 12/1818; H04L 51/04; H04L 51/14; H04N 21/4122; H04N 21/4126; H04N 21/4316; H04N 21/4788; H04N 21/25808; H04N 13/0497; H04N 5/44582; H04N 5/44591
See application file for complete search history.

(56) References Cited

U.S. PATENT DOCUMENTS

| | | | | |
|---|---|---|---|---|
| 8,656,302 B2* | 2/2014 | Nagano | ................. | G06F 3/1454 345/530 |
| 8,965,172 B2* | 2/2015 | Yu | ............................. | H04N 9/87 386/230 |
| 9,159,298 B2* | 10/2015 | Han | ....................... | G06F 3/1454 |
| 9,226,015 B2* | 12/2015 | Matsunaga | ........... | G06F 3/0488 |
| 9,632,648 B2* | 4/2017 | Lee | ........................ | G06F 3/048 |
| 9,819,906 B2* | 11/2017 | Lian | ........................ | H04N 7/15 |
| 2007/0020604 A1* | 1/2007 | Chulet | .................... | G09B 5/06 434/350 |
| 2007/0136498 A1* | 6/2007 | Tseng | ....................... | G06F 3/023 710/73 |
| 2008/0263455 A1* | 10/2008 | Stults | ................ | G06F 17/30067 715/748 |
| 2009/0102798 A1* | 4/2009 | Fujita | .................... | H04L 65/602 345/168 |
| 2011/0105187 A1* | 5/2011 | Dobroth | ................ | G06F 3/0481 455/566 |
| 2011/0113097 A1* | 5/2011 | Takeuchi | ........... | H04N 1/00183 709/204 |
| 2011/0115818 A1 | 5/2011 | Chung et al. | | |
| 2012/0159472 A1* | 6/2012 | Hong | ................. | H04L 12/1813 717/178 |
| 2012/0254773 A1* | 10/2012 | Viswanathan | ........ | G06F 3/0483 715/753 |
| 2013/0033496 A1* | 2/2013 | Raveendran | .......... | G06F 3/1407 345/428 |
| 2013/0078904 A1* | 3/2013 | Yang | ..................... | G06F 3/1454 455/3.06 |
| 2013/0139210 A1* | 5/2013 | Huang | .................... | H04W 4/06 725/109 |
| 2013/0188632 A1* | 7/2013 | Sheth | ................. | H04N 21/4302 370/350 |
| 2013/0238702 A1* | 9/2013 | Sheth | ...................... | H04L 67/38 709/204 |
| 2013/0266286 A1* | 10/2013 | Yu | ........................... | H04N 9/87 386/230 |
| 2013/0297839 A1* | 11/2013 | Chai | .................... | G06F 13/385 710/62 |
| 2013/0307796 A1* | 11/2013 | Liu | ........................ | G06F 3/041 345/173 |
| 2014/0071043 A1* | 3/2014 | Jung | ......................... | G06F 3/03 345/156 |
| 2014/0195675 A1* | 7/2014 | Silver | .................. | H04L 65/1083 709/224 |
| 2014/0282728 A1* | 9/2014 | Matsunaga | ........... | G06F 3/0488 725/38 |
| 2014/0372620 A1* | 12/2014 | Vedula | .................. | H04W 76/02 709/228 |
| 2015/0082241 A1* | 3/2015 | Kang | .................. | G06F 3/04845 715/803 |
| 2015/0095798 A1* | 4/2015 | Yang | ..................... | G06F 3/1454 715/751 |
| 2015/0172757 A1* | 6/2015 | Kafle | .................. | H04L 67/1044 725/81 |
| 2015/0193187 A1* | 7/2015 | Kimn | ..................... | G06F 3/1454 345/1.2 |
| 2015/0249714 A1* | 9/2015 | Vedula | .................. | H04L 67/141 709/228 |
| 2015/0271431 A1* | 9/2015 | Miao | ........................ | H04N 5/93 386/230 |
| 2016/0027402 A1* | 1/2016 | Yanazume | ................ | G06F 3/14 345/2.3 |
| 2016/0316243 A1* | 10/2016 | Park | .................... | H04N 21/2343 |

FOREIGN PATENT DOCUMENTS

| | | |
|---|---|---|
| CN | 101795240 | 8/2010 |
| CN | 202050432 | 11/2011 |
| CN | 103339595 | 10/2013 |
| CN | 103384377 | 11/2013 |
| CN | 103888503 | 6/2014 |
| WO | 2012100197 | 7/2012 |

OTHER PUBLICATIONS

"Office Action of Taiwan Counterpart Application", dated Aug. 27, 2015, p. 1-p. 12, with English translation thereof, in which the listed references were cited.

"Office Action of Taiwan Counterpart Application," dated Jun. 27, 2016, p. 1-p. 11, with English translation thereof, in which the listed reference was cited.

"Office Action of Taiwan Counterpart Application" with partial English translation, dated Apr. 11, 2016, p. 1-p. 11, in which the listed reference was cited.

"Office Action of Taiwan Counterpart Application" with partial English translation, dated Sep. 19, 2016, p. 1-p. 10, in which the listed references were cited.

"Office Action of China Counterpart Application," dated Sep. 11, 2017, p. 1-p. 11, in which the listed references were cited.

\* cited by examiner

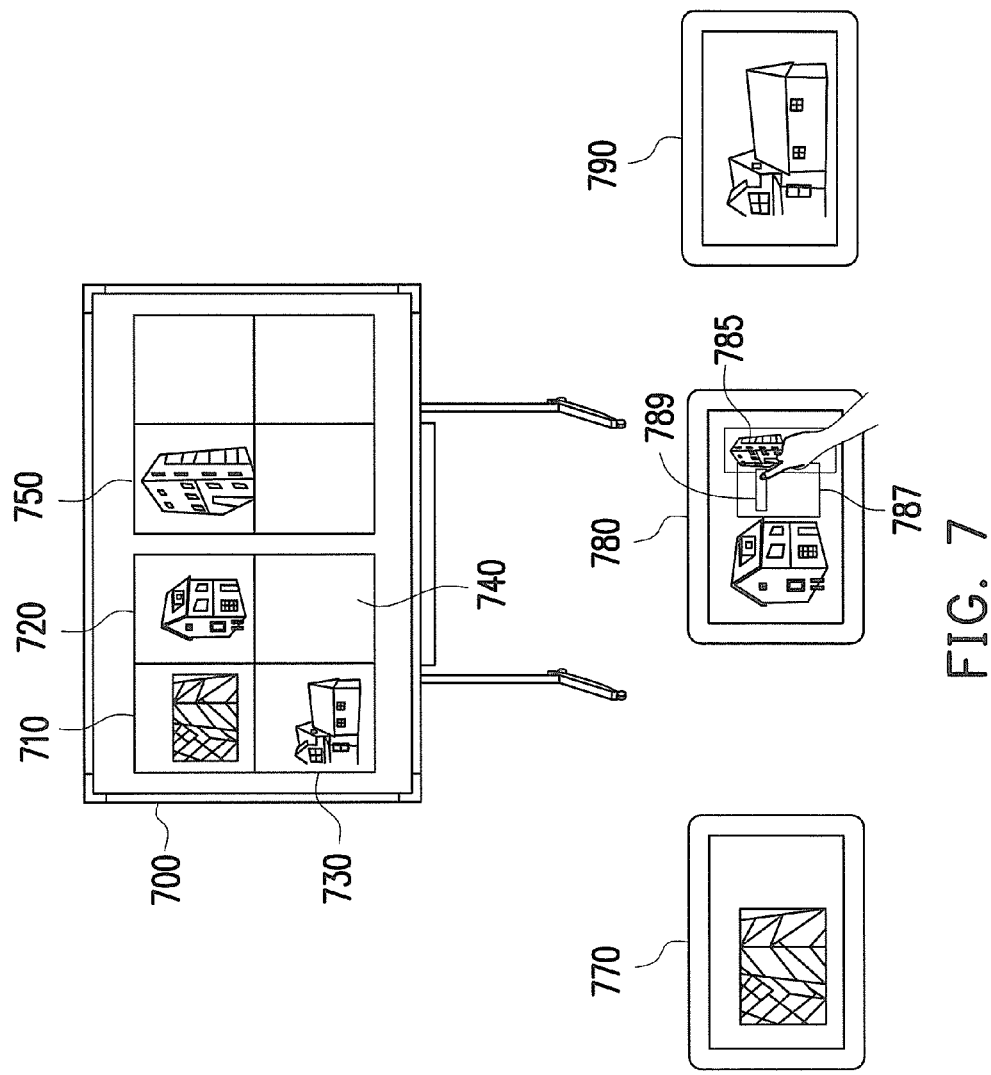

METHOD AND APPARATUS FOR SHARING DISPLAY FRAME

CROSS-REFERENCE TO RELATED APPLICATION

This application claims the priority benefit of Taiwan application serial no. 103122530, filed on Jun. 30, 2014. The entirety of the above-mentioned patent application is hereby incorporated by reference herein and made a part of this specification.

BACKGROUND

Technical Field

The invention relates to a screen mirroring technology, and particularly relates to a method and apparatus for sharing display frame capable of synchronously displaying a plurality of frames on specified electronic apparatuses.

Related Art

Along with development of technology, educators in classrooms have used electronic whiteboards and peripheral device thereof (for example, stylus, touch panels, etc.) to replace a teaching mode of writing on backboards by using chalks, so as to avoid occupational diseases caused by using of the chalks. The electronic whiteboard is a tool that facilitates writing and teaching of the educator, which is equipped with a touch panel. The touch panel can detect touch positions of the stylus held by the educator, and can draw a corresponding pattern according to a track of the touch positions.

Moreover, along with quick development of wireless communication technology, transmission bandwidth and transmission quality used for image synchronous display are continuously enhanced, and application of a screen mirroring technology such as wireless fidelity (WiFi) display, airplay, wireless display (WiDi) and Miracast of the WiFi display, etc. is gradually popularised. The screen mirroring technology can synchronously display a screen frame of a source on other electronic apparatuses (for example, a notebook computer, a smart television, a smart phone or a tablet personal computer, etc.) based on WiFi or other wireless transmission techniques, and the educator can also combine the electronic whiteboard with the aforementioned screen mirroring technology to share teaching frames with students.

Generally, the screen mirroring technology can only provide one-to-one frame share. Namely, the source device used for sharing frame can only share a single frame displayed thereon to other sink devices. The educator cannot simultaneously share a plurality of teaching themes or different screen frames to a specific student or specific students, and cannot simultaneously implement interactive teaching with a plurality of students, such that the screen mirroring technology cannot be flexibly applied to teaching activities.

SUMMARY

The invention is directed to a method and an apparatus for sharing display frame, by which a frame displayed on an electronic apparatus is simultaneously displayed on a plurality of other specific electronic apparatuses among all electronic apparatuses.

The invention provides a method for sharing display frame, which is adapted to a first electronic apparatus, the method includes following steps. A plurality of second electronic apparatuses are searched, where each of the second electronic apparatuses is configured to display a corresponding display frame. One or a plurality of the second electronic apparatuses are selected. At least one first frame displayed by the first electronic apparatus is synchronously displayed on one or a plurality of the selected second electronic apparatuses.

In an embodiment of the invention, the step of selecting one or a plurality of the second electronic apparatuses includes following steps. A first selection operation corresponding to one of the at least one first frame is received, so as to provide options for selecting the second electronic apparatuses according to the first selection operation. A second selection operation corresponding to one or a plurality of the options of the second electronic apparatuses is received, so as to select one or a plurality of the second electronic apparatuses according to the second selection operation.

In an embodiment of the invention, after the step of receiving the second selection operation corresponding to one or a plurality of the options of the second electronic apparatuses, so as to select one or a plurality of the second electronic apparatuses according to the second selection operation, the method further includes following steps. A third selection operation of the first frame different to the first frame selected by the first selection operation is received, so as to provide options for selecting the second electronic apparatuses according to the third selection operation. A fourth selection operation corresponding to one or a plurality of the options of the second electronic apparatuses is received, so as to select one or a plurality of the second electronic apparatuses according to the fourth selection operation.

In an embodiment of the invention, the step of synchronously displaying the at least one first frame displayed by the first electronic apparatus on one or a plurality of the selected second electronic apparatuses includes following steps. A connection with one or a plurality of the selected second electronic apparatuses is established. The first frame is extracted, and the extracted first frame is decoded or encoded. A real-time streaming protocol (RTSP) session is established with one or a plurality of the selected second electronic apparatuses on the connection. Content of the at least one first frame displayed by the first electronic apparatus is streamed to one or a plurality of the selected second electronic apparatuses through the RTSP session.

In an embodiment of the invention, before the step of selecting one or a plurality of the second electronic apparatuses, the method further includes displaying the at least one first frame in a plurality of panes or a plurality of windows.

In an embodiment of the invention, after the step of synchronously displaying the at least one first frame displayed by the first electronic apparatus on one or a plurality of the selected second electronic apparatuses, the method further includes following steps. A user input back channel (UIBC) session is established with one or a plurality of the selected second electronic apparatuses. A plurality of control signals are respectively received through the UIBC session. The at least one corresponding first frame is synchronously controlled according to the control signals.

In an embodiment of the invention, after the step of synchronously displaying the at least one first frame displayed by the first electronic apparatus on one or a plurality of the selected second electronic apparatuses, the method further includes following steps. Content of at least one second frame of one or a plurality of the selected second electronic apparatuses that is specified to be displayed by the first electronic apparatus is received. The at least one second frame is synchronously displayed on the at least one first frame displayed by the first electronic apparatus.

According to another aspect, the invention provides an apparatus for sharing display frame. The apparatus includes a display unit, a communication unit and a processing unit. The display unit is configured to display at least one first frame. The processing unit is coupled to the display unit and the communication unit, and searches a plurality of electronic apparatuses through the communication unit, where each of the electronic apparatuses is configured to display a corresponding display frame. The processing unit selects one or a plurality of the electronic apparatuses, and the processing unit synchronously displays the at least one first frame displayed by the display unit on one or a plurality of the selected electronic apparatuses.

In an embodiment of the invention, the display unit receives a first selection operation corresponding to one of the at least one first frame, so as to provide options for selecting the electronic apparatuses according to the first selection operation. The display unit receives a second selection operation corresponding to one or a plurality of the options of the electronic apparatuses, and the processing unit selects one or a plurality of the electronic apparatuses according to the second selection operation.

In an embodiment of the invention, the display unit receives a third selection operation of the first frame different to the first frame selected by the first selection operation, so as to provide options for selecting the electronic apparatuses according to the third selection operation. The display unit receives a fourth selection operation corresponding to one or a plurality of the options of the electronic apparatuses, and the processing unit selects one or a plurality of the electronic apparatuses according to the fourth selection operation.

In an embodiment of the invention, the communication unit establishes a connection with one or a plurality of the selected electronic apparatuses, and the processing unit extracts the first frame, and decodes and encodes the extracted first frame. The communication unit respectively establishes a real-time streaming protocol (RTSP) session with one or a plurality of the selected electronic apparatuses on the connection, and the processing unit streams content of the at least one first frame displayed by the display unit to one or a plurality of the selected electronic apparatuses through the RTSP session by using the communication unit.

In an embodiment of the invention, the display unit displays the at least one first frame in a plurality of panes or a plurality of windows.

In an embodiment of the invention, the communication unit respectively establishes a user input back channel (UIBC) session with one or a plurality of the selected electronic apparatuses, and the communication unit respectively receives a plurality of control signals through the UIBC session, and the processing unit synchronously controls the at least one corresponding first frame according to the control signals.

In an embodiment of the invention, the communication unit receives content of at least one second frame of one or a plurality of the selected electronic apparatuses that is specified to be displayed by the display unit, and the processing unit synchronously displays the at least one second frame on the at least one first frame through the display unit.

According to the above descriptions, according to the embodiment of the invention, the communication unit is used to search the electronic apparatuses for the user to select, and the electronic apparatuses serving as sinks are determined according to the selection operation of the user, and the display frame displayed on the display unit is synchronously displayed on the electronic apparatuses selected by the user. Moreover, in the embodiment of the invention, frames can be displayed on a plurality panes or a plurality of windows through the display unit, and the user can select the frames to synchronously display a plurality of display frames to different electronic apparatuses of users. In this way, the user can share a plurality of frames with a plurality of different electronic apparatuses among all electronic apparatuses according to an actual requirement.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 7 is an example of a method for sharing display frame according to an embodiment of the invention.

DETAILED DESCRIPTION OF DISCLOSED EMBODIMENTS

According to a WiFi display technique, a source device and a sink device may establish a session connection there between, and the source device can transmit a screen frame to the sink device through the connection. In an embodiment of the invention, a plurality of media access control (MAC) addresses and multiple sessions are used to activate a multi-link WiFi display connection between the source device and a plurality of sink devices, and the user can freely select different frames and apparatuses from the source device for sharing with the selected specific sinks. Based on such mechanism, an electronic whiteboard can serve as a source device used for sharing frames and receiving user input back channel (UIBC) instructions, and even serve as the sink to receive frames shared by other electronic apparatuses. In this way, in teaching activity, an educator can share the frame of the electronic whiteboard (a first electronic apparatus) with all of or a part of tablet PCs (the second electronic apparatuses) of the students, and can also provide a convenient and interactive learning mode. A plurality of embodiments coping with the spirit of the invention are provided below, and the embodiments can be suitably adjust by those skilled in the art according to an actual requirement, and are not limited to the content described below.

Figure 1:
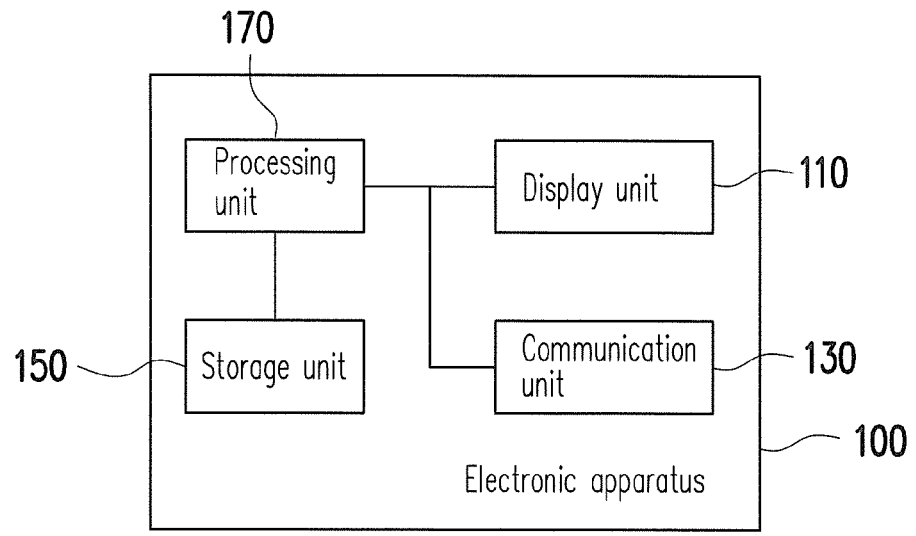
FIG. 1 is a block diagram of an apparatus for sharing display frame according to an embodiment of the invention.

FIG. 1 is a block diagram of an apparatus for sharing display frame according to an embodiment of the invention. Referring to FIG. 1, the electronic apparatus 100 includes a display unit 110, a communication unit 130, a storage unit 150 and a processing unit 170. The electronic apparatus 100 can be an electronic whiteboard, a desktop computer, a tablet personal computer (PC), etc.

The display unit 110 is, for example, a liquid crystal display (LCD), a light-emitting diode (LED) display, a field emission display (FED) or a display panel of other types of displays, for example, a touch display unit consisting of a resistive touch panel, a capacitive touch panel or an optical touch panel, which can simultaneously provide a display function and a touch operation function. The display unit 110 is used for displaying a first frame. In the present embodiment, the display unit 110 displays the first frame on a plurality of panes or a plurality of windows, where the first frame can be a program window, an object or a screen frame, etc., which is not limited by the invention. For example, the display unit 110 respectively display four program windows on four panes. In an embodiment, the display unit 110 can also display one pane or one window only.

The communication unit 130 may support a bluetooth standard, a WiFi standard, a near field communication (NFC) standard, a $3^{rd}$ generation partnership project (3GPP) standard, or any type of wireless communication module having the wireless transmission function or a cable communication module connecting through an asymmetric digital subscriber line (ADSL), a cable modem, etc.

The storage unit 150 can be any type of a hard disk drive (HDD) or a random access memory (RAM), a read-only memory (ROM), a flash memory or a similar device or a combination of the above devices.

The processing unit 170 is coupled to the display unit 110, the communication unit 130 and the storage unit 150. The processing unit 170 can be a central processing unit (CPU) or a programmable general purpose or special purpose microprocessor, a digital signal processor (DSP), a programmable controller, an application specific integrated circuit (ASIC), a system on chip (SoC) or other similar devices or a combination of the above devices. In the present embodiment, the processing unit 170 is used for processing all of tasks of the electronic apparatus 100.

Figure 2:
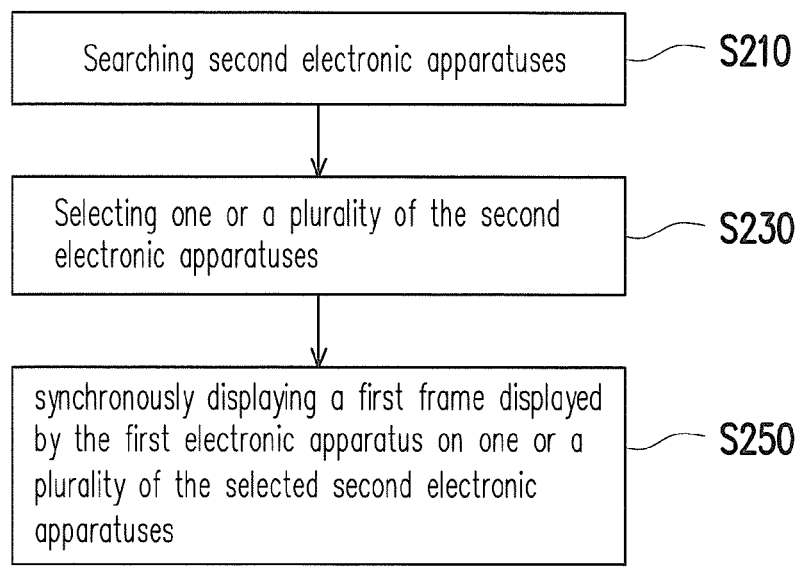
FIG. 2 is a flowchart illustrating a method for sharing display frame according to an embodiment of the invention.

FIG. 2 is a flowchart illustrating a method for sharing display frame according to an embodiment of the invention. Referring to FIG. 2, the method of the present embodiment is adapted to the electronic apparatus 100 of FIG. 1. In following description, the method of the invention is described with reference of various modules and components of the electronic apparatus 100. The flow of the method can be adjusted according to an actual implementation, and is not limited to the flow of FIG. 2.

In step S210, the processing unit 170 searches other electronic apparatuses (for example, tablet PCs, notebook computers, etc., which are referred to as second electronic apparatuses for simplicity's sake) through the communication unit 130, where each of the second electronic apparatuses is configured to display a corresponding display frame. In an embodiment, when the processing unit 170 activates a source mode, the processing unit 170 performs a device scanning procedure for device discovery through the communication unit 130 based on the communication technique supported by the communication unit 130, so as to search the second electronic apparatuses that support a communication technique the same as the communication technique supported by the communication unit 130. The second electronic apparatuses also perform a peer-to-peer (P2P) detection procedure to exchange P2P information (for example, MAC address, Internet protocol (IP) address, group owner/client information, P2P information element, etc.) and device type information with the electronic apparatus 100. The processing unit 170 stores the obtained information in the storage unit 150. Moreover, the second electronic apparatuses further include the display unit 110 for the use of subsequent frame sharing, where description of the display unit 110 and the communication unit 130 may refer to the aforementioned description, which is not repeated. It should be noticed that the communication unit 130 may adopt a specific communication protocol according to a design requirement. For example, the communication unit 130 is established on a tunneled direct link setup (TDLS) or a hotspot, and establishes a WiFi display communication protocol layer through a transmission control protocol (TCP)/IP, a user datagram protocol (UDP), a real-time transport protocol (RTP) or a real-time streaming protocol (RTSP) to search, connect and mirror frames to the second electronic apparatuses, which is not limited by the invention.

For example, when the electronic apparatus 100 is based on the WiFi display technique, the user can press or touch a virtual or physical button (for example, a "WFD SRC" button) representing "source" on the electronic apparatus 100 to switch the electronic apparatus 100 to the source mode, or the user can press or touch a virtual or physical button (for example, a "WFD SNK" button) representing "sink" on the electronic apparatus 100 to switch the electronic apparatus 100 to the sink mode. Then, the electronic apparatus 100 executes a searching procedure to search the second electronic apparatuses having the WiFi direct link technique in the neighbouring communication area.

In step S230, the processing unit 170 selects one or a plurality of the second electronic apparatuses according to selection of the user on the display unit 110 of the electronic apparatus 100. In an embodiment, the display unit 110 receives a first selection operation (for example, double click, long press, etc.) corresponding to one of the first frames, so as to provide options (for example, numbers, specific name display) for selecting the electronic apparatuses according to the first selection operation, and the display unit 110 receives a second selection operation (for example, a click operation, etc.) corresponding to one or a plurality of the options of the second electronic apparatuses, and the processing unit 170 selects one or a plurality of the second electronic apparatuses according to the second selection operation.

Figure 3:
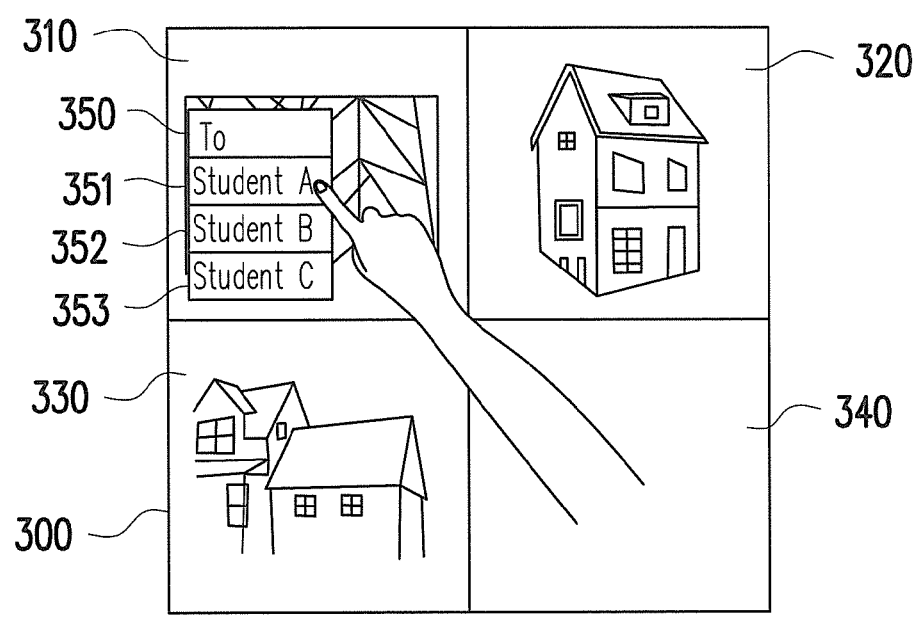
FIG. 3 is an example of selecting second electronic apparatuses according to an embodiment of the invention.

FIG. 3 is an example of selecting the second electronic apparatuses according to an embodiment of the invention. Referring to FIG. 3, a frame 300 in FIG. 3 is displayed on the display unit 110, and the display unit 110 displays the frame 300 through frames 310, 320, 330 and 340 by using a plurality of panes. When the display unit 110 receives a long press operation of the user in the pane of the frame 310, the processing unit 170 provides an option 350 for selection through the display unit 110 according to a touch position of the user. The option 350 includes sub options 351, 352 and 353, and the sub options 351, 352 and 353 respectively represent three second electronic apparatuses held by "student A", "student B" and "student C". When the display unit 110 receives a click operation of the user on the sub option 351 of the "student A", the processing unit 170 selects the second electronic apparatus corresponding to the sub option 351 of the "student A" to serve as a subsequent screen mirroring device. Moreover, in another exemplary embodiment, the display unit 110 receives click operations performed on a plurality of sub options (for example, the sub options 351 and 352) by the user within a period of time, or the display unit 110 receives a confirmation operation executed by the user (for example, receives an operation of clicking a "confirm" button displayed on the display unit 110) after receiving the click operations performed on a plurality of the sub options (for example, the sub options 351-353) by the user, the processing unit 170 selects a plurality of corresponding second electronic apparatuses to serve as the subsequent screen mirroring devices according to the selection operations of the user on a plurality of the sub options. It should be noticed that in FIG. 3, the selection operations received by the display unit 110, the frames and the options are only an example, and in other embodiments, the other selection operations, frames and options are also applicable, which are determined according to an actual design requirement and are not limited by the invention.

It should be noticed that in an embodiment, before the step S230, the processing unit 170 may first execute a list creating procedure, by which the processing unit 170 obtains information (for example, the MAC address or the IP address, etc.) obtained in the step S210 from the storage unit 150, and arranges the second electronic apparatus that can be connected to each other according to the obtained information, and the processing unit 170 can also compare the obtained information with information in a predetermined list to provide corresponding specific names, symbols or codes, and the processing unit 170 can take the symbols, the codes or the compared specific names as the options of the second electronic apparatuses. For example, the IP address 192.168.1.1 represents the "student A" or the IP address 192.168.1.3 represents the "student B".

In step S250, the processing unit 170 synchronously displays the first frame displayed by the display unit 110 on one or a plurality of the selected second electronic apparatuses. In an embodiment, the communication unit 130 establishes a connection with one or a plurality of the selected second electronic apparatuses, and the processing unit 170 first extracts the first frame, and decodes and encodes the extracted first frame. The communication unit 130 respectively establishes an IP session, a UDP session, a RTP session and a RTSP session with one or a plurality of the selected second electronic apparatuses on the connection, and the processing unit 170 streams content of the first frame displayed by the display unit 110 to one or a plurality of the selected second electronic apparatus through the IP session, the UDP session, the RTP session and the RTSP session by using the communication unit 130.

In detail, the communication unit 130 executes a connection setup procedure and a capability negotiation procedure to respectively establish P2P connections (for example, to sequentially establish an IP connection of a network layer, a TCP connection of a transport layer, or a UDP connection, etc.) between the electronic apparatus 100 and the selected second electronic apparatuses, and the processing unit 170 determines parameters of video and audio transmission such as a video specification (for example, resolution, a frame rate, etc.), an audio specification (for example, a sampling rate, etc.), etc. Then, the communication unit 130 establishes a RTSP session with one or a plurality of the selected second electronic apparatuses on one or a plurality of the established connections. In this way, the communication unit 130 can establish a plurality of session connections. The processing unit 170 performs encoding processing on the first frame according to the parameters (for example, the video specification, the audio specification, etc.) required by each of the session connections, and the processing unit 170 streams the encoded first frame to the selected second electronic apparatuses through the communication unit 130 based on AV stream control. In this way, the electronic apparatus 100 can respectively mirror the first frame to a plurality of the selected second electronic apparatuses according to a plurality of the established session connections. It should be noticed that the invention is not limited to the aforementioned establishing flow of the WiFi display communication connection, and in other embodiments, the establishing flow is determined according to an actual requirement, and the present embodiment of the invention can also be applied to a screen mirror technology such as wireless display (WiDi), etc.

Figure 4:
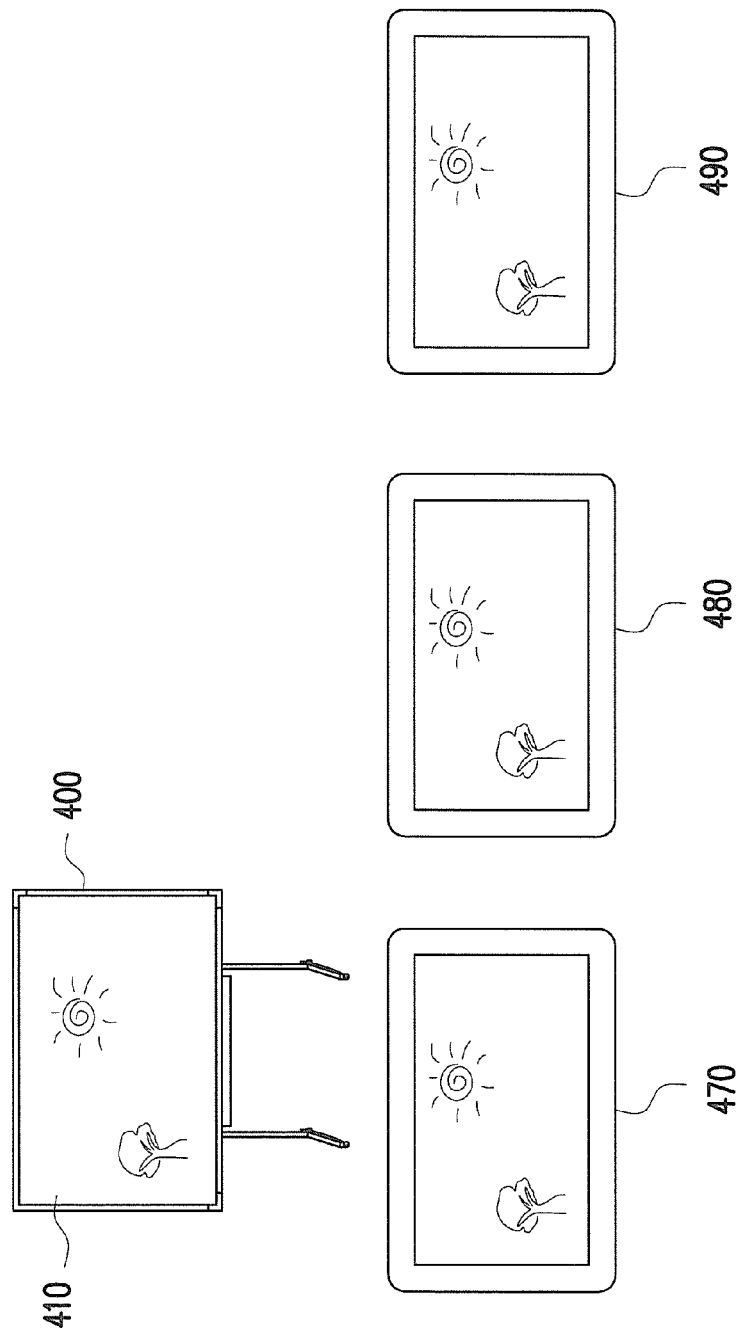
FIG. 4 is an example of a method for sharing display frame according to an embodiment of the invention.

For example, FIG. 4 is an example of a method for sharing display frame according to an embodiment of the invention. Referring to FIG. 3 and FIG. 4, the electronic whiteboard 400 displays a first frame 410, and the electronic whiteboard 400 receives a long press operation performed by the educator on the first frame 410, and the electronic whiteboard 400 displays the option 350 shown in FIG. 3 for the educator to select. After the electronic whiteboard 400 receives the selection operations of the educator obtained when the educator clicks the sub options 351, 352 and 353, the electronic whiteboard 400 can simultaneously mirror the first frame 410 to the second electronic apparatuses 470, 480 and 490 held by the "student A", the "student B" and the "student C".

Moreover, the display unit 110 of the present embodiment can simultaneously display different first frames (for example, frames 310-340 in FIG. 3) in a plurality of panes or windows. In an embodiment, the display unit 110 receives a third selection operation of the first frame different to the first frame selected by the first selection operation (for example, the first selection operations is that the user clicks the frame 310 in FIG. 3, and the third selection operation is that the user clicks the frame 320 in FIG. 3), so as to provide an option (for example, the option 350 shown in FIG. 3) for selecting the second electronic apparatuses according to the third selection operation. The display unit 110 receives a fourth selection operation corresponding to one or a plurality of the options of the second electronic apparatuses (for example, the user clicks the sub option 353 of FIG. 3), and the processing unit 170 selects one or a plurality of the second electronic apparatuses according to the fourth selection operation. Then, the processing unit 170 can mirror the other first frame to a plurality of the selected second electronic apparatuses according to the step S250. In this way, the user can respectively mirror a plurality of the first frames displayed by the electronic apparatus 100 to the specified second electronic apparatuses, and in case of teaching activity, the educator can assign different teaching themes to different students in classroom.

Figure 5:
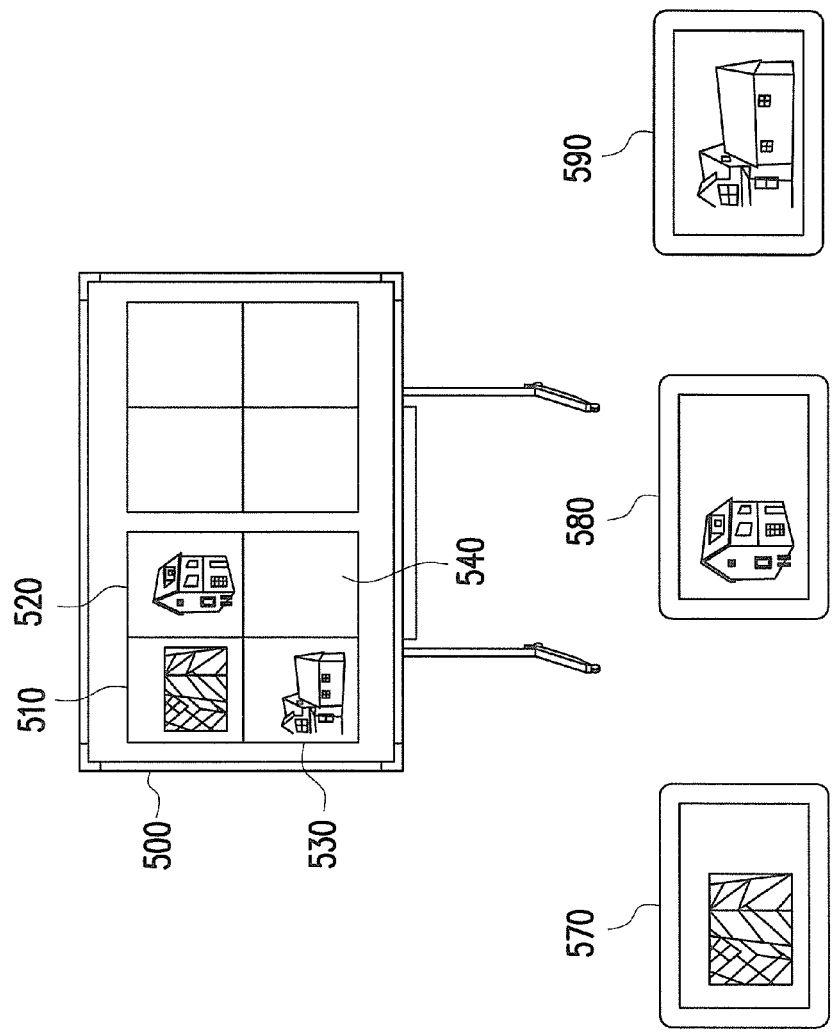
FIG. 5 is an example of a method for sharing display frame according to an embodiment of the invention.

For example, FIG. 5 is an example of a method for sharing display frame according to an embodiment of the invention. Referring to FIG. 3 and FIG. 5, the electronic whiteboard 500 displays frames 510, 520, 530 and 540, and when the electronic whiteboard 500 receives a selection operation double-clicked on the display frame 510 by the educator, the electronic whiteboard 500 provides the option 350 shown in FIG. 3. After the electronic whiteboard 500 receives a selection operation clicked on the sub option 351 by the educator, the electronic whiteboard 500 mirrors the frame 510 to the second electronic apparatus 570 held by the "student A". Deduced by analogy, the electronic whiteboard 500 can also respectively mirror the frames 520 and 530 to the second electronic apparatuses 580 and 590 held by the "student B" and the "student C" according to the selection operations of the educator.

Moreover, in the aforementioned embodiment, the electronic apparatus 100 can synchronously display a plurality of the first frames displayed on the display unit 110 on a plurality of second electronic apparatuses, and the electronic apparatus 100 may also receive remote controls from the second electronic apparatuses, which is described below with reference of an embodiment.

In an embodiment, the communication unit 130 respectively establishes a user input back channel (UIBC) session with one or a plurality of the selected second electronic apparatuses, and the communication unit 130 respectively receives control signals through the UIBC sessions, and the processing unit 170 synchronously controls the first frames according to the control signals. In detail, when the communication unit 130 establishes multiple session connections in the step S250, the communication unit 130 can also respectively establish a plurality of UIBC connections according to a UIBC protocol (for example, to perform a capability negotiation procedure, a UIBC updating procedure, etc.), and the communication unit 130, for example, activates a network socket to receive control signals (for example, to move a mouse indicator, keyboard input, gesture input, remote control, etc.) from the selected second electronic apparatuses, and the processing unit 170 controls the corresponding first frames according to the control signals and the UIBC sessions. In this way, the electronic apparatus 100 implements two-way interaction with the second electronic apparatuses, and in case of teaching activity, the students can reflect their ideas or actions on the electronic whiteboard controlled by the educator. It should be noticed that the control signal method can be varied along with UIBC hardware or software configuration supported by the electronic apparatus 100 and the second electronic apparatuses, which is determined according to an actual design requirement and is not limited by the invention.

Figure 6:
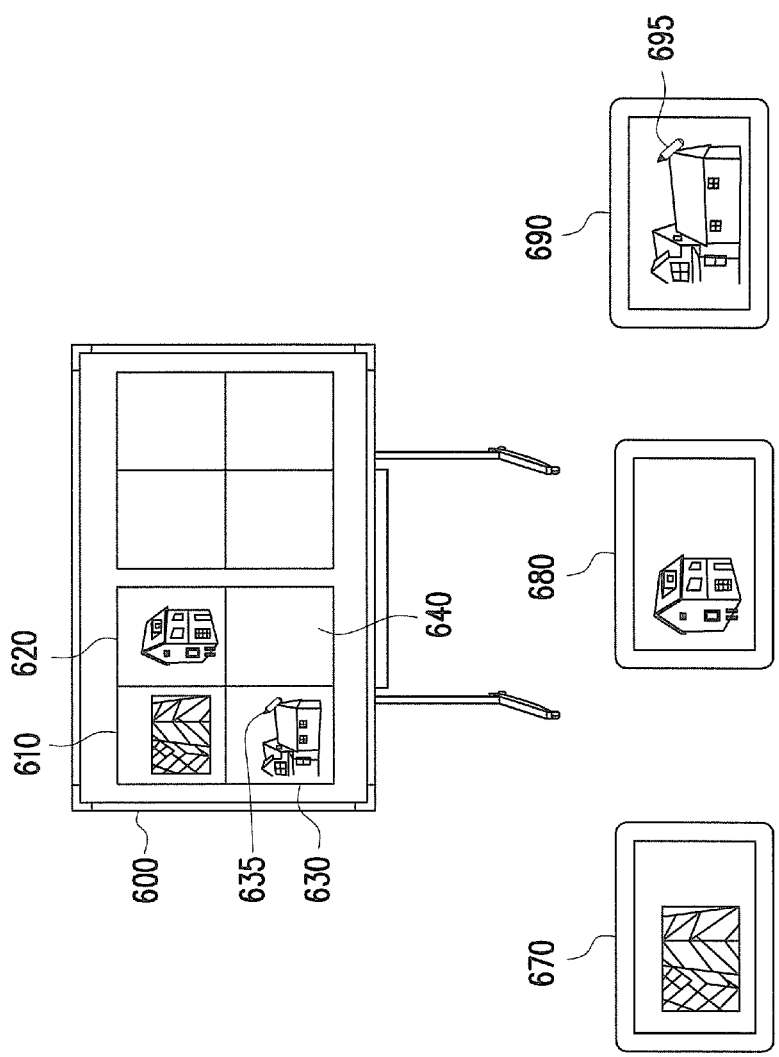
FIG. 6 is an example of a method for sharing display frame according to an embodiment of the invention.

For example, FIG. 6 is an example of a method for sharing display frame according to an embodiment of the invention. Referring to FIG. 6, the electronic whiteboard 600 displays frames 610, 620, 630 and 640. After a second electronic apparatus 690 receives a touch operation performed by the student C on a display screen of the second apparatus 690 through a finger, the frame displayed by the second electronic apparatus 690 presents a brush 695, and when the second electronic apparatus 690 receives an operation that the student C controls the brush 695, the second electronic apparatus 690 generates a control signal, and the second electronic apparatus 690 transmits the control signal to the electronic whiteboard 600. After the electronic whiteboard 600 receives the control signal transmitted by the second electronic apparatus 690, the processing unit 170 generates a brush 635 according to the control signal, and controls a motion or drawing of the brush 635.

Moreover, in the aforementioned embodiment, the electronic apparatus 100 serves as a source device to share the first frame to the second electronic apparatuses, or the electronic apparatus 100 receives the control signal from the second electronic apparatus, in other embodiments, the electronic apparatus 100 can also serve as a sink device to synchronously display the frames displayed by the second electronic apparatuses on all of or a part of the first frames, which is described below with reference of an embodiment.

In an embodiment, the communication unit 130 receives content of a second frame of one or a plurality of the selected second electronic apparatuses that is specified to be displayed by the display unit 110, and the processing unit 170 synchronously displays the second frame on the first frames through the display unit 110. In detail, the electronic apparatus 100 can also activate a sink mode during the searching procedure of the step S210 of FIG. 2. The processing unit 170 also executes the device searching procedure and the list creating procedure of the sink mode, and the communication unit 130 waits for connection. The second electronic apparatus may select the electronic apparatus 100 to serve as a frame mirroring device according to the description of the steps of FIG. 2, which is not repeated. Then, the processing unit 170 executes a connection setup procedure, a capability negotiation procedure, a RTSP session setup procedure, etc. with the second electronic apparatus through the communication unit 130, and the communication unit 130 receives a streaming signal (i.e. the second frame of the second electronic apparatus) transmitted by the second electronic apparatus through the session established with the second electronic apparatus, and the processing unit 170 performs decoding processing on the second frame according to parameters (video specification and audio specification, etc.) required by the session connection. The processing unit 170 determines to display the decoded second frame on one of the first frames currently displayed by the display unit 110. For example, the processing unit 170 displays the second frame on a blank first frame through the display unit 110.

In an embodiment, the electronic apparatus 100 can also divide the frames displayed by the display unit 110 into source frames and sink frames, where when the display unit 110 receives an operation similar to the step S230 of FIG. 2 that is performed by the user on a first frame in the source frames, the processing unit 170 synchronously displays the selected first frame on the second electronic apparatuses selected by the user, and when the communication unit 130 receives the content of the second frame transmitted by the second electronic apparatus, the processing unit 170 synchronously displays the second frame on a first frame in the sink frames through the display unit 110.

Moreover, the electronic apparatus 100 can also establish a UIBC session on the corresponding connection, so as to control the second frame of the second electronic apparatus in a remote distance, and detailed description thereof may refer to the aforementioned embodiment, and details thereof are not repeated. In this way, the electronic apparatus 100 can be quickly switched from the source mode to the sink mode, and the electronic apparatus 100 can simultaneously serve as a source end and a sink end. In case of teaching activity, the students can change the themes according to an actual requirement, and the frame displayed on the second electronic apparatus held by the student can be synchronously displayed on the electronic whiteboard used by the educator.

For example, FIG. 7 is an example of a method for sharing display frame according to an embodiment of the invention. Referring to FIG. 7, the electronic whiteboard 700 displays frames 710, 720, 730 740 and 750. It is assumed that the student B turns on a frame 785 on a second electronic apparatus 780, after the second electronic apparatus 780 receives a long press operation performed by the student B on the frame 785 through a finger, the second electronic apparatus 780 displays an option 787 (related description of the option 787 may refer to the option 350 of FIG. 3), where the option 789 includes a sub option 789 representing the electronic whiteboard 700. After the second electronic apparatus 780 receives a click operation of the student performed on the sub option 789, the second electronic apparatus 780 synchronously displays the frame 785 on the frame 750 of the electronic whiteboard 700. Deduced by analogy, the second electronic apparatus 780 can also synchronously display the frame 785 on the second electronic apparatuses 770 and 790, which is not repeated.

In summary, the processing unit of the invention searches the connectable second electronic apparatuses through the communication unit, and the processing unit selects the second electronic apparatuses according to the selection operations of the user performed on the display unit, and then the processing unit establishes a plurality of session connections through the communication unit to synchronously display the first frame displayed by the display unit on the selected second electronic apparatuses. Moreover, the electronic apparatus of the invention can also receive the control signals transmitted by the second electronic apparatuses through the UIBC sessions, or the electronic apparatus can receive the content of the second frame transmitted by the second electronic apparatus to quickly switch the electronic apparatus to the sink mode. In this way, the user can synchronously display a plurality of frames of the electronic apparatus on a plurality of specified second electronic apparatuses, and in case of teaching activity, the educator can share the frames of the electronic whiteboard with the tablet PCs of all of or a part of the students, and the electronic whiteboard can provide a convenient and interactive learning mode.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A method for sharing display frame, adapted to a first electronic apparatus, the method for sharing display frame comprising:
   displaying a plurality of panes respectively comprising a plurality of first frames;
   searching a plurality of second electronic apparatuses, wherein each of the second electronic apparatuses is configured to display a corresponding display frame;
   selecting a first pane and a second pane of the plurality of panes which are currently displayed by the first electronic apparatus;
   selecting at least one of the second electronic apparatuses as at least one first sink based on the first pane, and selecting at least one of the second electronic apparatuses as at least one second sink based on the second pane; and
   transmitting the first frame corresponding to the first pane to the at least one first sink, and transmitting the first frame corresponding to the second pane to the at least one second sink; and
   synchronously displaying the first frame corresponding to the first pane on the first pane and the at least one first sink, and simultaneously, synchronously displaying the first frame corresponding to the second pane on the second pane and the at least one second sink.

2. The method for sharing display frame as claimed in claim 1, wherein the step of selecting at least one of the second electronic apparatuses as at least one first sink based on the first pane comprising:
   receiving a first selection operation corresponding to the first frame corresponding to the first pane, so as to provide options for selecting the second electronic apparatuses according to the first selection operation; and
   receiving a second selection operation corresponding to at least one of the options of the second electronic apparatuses, so as to select at least one of the second electronic apparatuses as at the least one first sink according to the second selection operation.

3. The method for sharing display frame as claimed in claim 2, wherein the step of selecting at least one of the second electronic apparatuses as at least one second sink based on the second pane comprising:
   receiving a third selection operation corresponding to the first frame corresponding to the second pane, so as to provide options for selecting the second electronic apparatuses according to the third selection operation; and
   receiving a fourth selection operation corresponding to at least one of the options of the second electronic apparatuses, so as to select at least one of the second electronic apparatuses as the at least one second sink according to the fourth selection operation.

4. The method for sharing display frame as claimed in claim 2, wherein the step of synchronously displaying the first frame corresponding to the first pane on the first pane and the at least one first sink comprises:
   establishing a connection with the at least one first sink;
   extracting the first frame corresponding to the first pane, and decoding or encoding the extracted first frame;
   respectively establishing a real-time streaming protocol (RTSP) session with the at least one first sink on the connection; and
   streaming content of the first frame corresponding to the first pane to the at least one first sink through the RTSP session.

5. The method for sharing display frame as claimed in claim 1, wherein after the step of synchronously displaying the first frame corresponding to the first pane on the first pane and the at least one first sink, and simultaneously, synchronously displaying the first frame corresponding to the second pane on the second pane and the at least one second sink, the method further comprises:
   respectively establishing a user input back channel (UIBC) session with the at least one first sink and the at least one second sink;
   respectively receiving a plurality of control signals through the UIBC session; and
   synchronously controlling the at least one corresponding first frame according to the control signals.

6. The method for sharing display frame as claimed in claim 1, wherein after the step of synchronously displaying the first frame corresponding to the first pane on the first pane and the at least one first sink, and simultaneously, synchronously displaying the first frame corresponding to the second pane on the second pane and the at least one second sink, the method further comprises:
   receiving content of at least one second frame of the at least one first sink that is specified to be displayed by the first electronic apparatus; and
   synchronously displaying the at least one second frame on the first frame corresponding to the first pane displayed by the first electronic apparatus.

7. An apparatus for sharing display frame, comprising:
   a display unit, configured to display a plurality of panes respectively comprising a plurality of first frames;
   a communication unit; and
   a processing unit, coupled to the display unit and the communication unit, and searching a plurality of electronic apparatuses through the communication unit, wherein each of the electronic apparatuses is configured to display a corresponding display frame, wherein the processing unit selects a first pane and a second pane of the plurality of panes which are currently displayed by the display unit, wherein the processing unit selects at least one of the electronic apparatuses as at least one first sink based on the first pane, and selects at least one of the electronic apparatuses as at least one second sink based on the second pane, wherein the processing unit transmits the first frame corresponding to the first pane to the at least one first sink, and transmits the first frame corresponding to the second pane to the at least one second sink, wherein the processing unit synchronously displays the first frame corresponding to the first pane on the first pane and the at least one first sink, and simultaneously, synchronously displays the first frame corresponding to the second pane on the second pane and the at least one second sink.

8. The apparatus for sharing display frame as claimed in claim 7, wherein the display unit receives a first selection operation corresponding to the first frame corresponding to the first pane, so as to provide options for selecting the electronic apparatuses according to the first selection operation, the display unit receives a second selection operation corresponding to at least one of the options of the electronic apparatuses, and the processing unit selects at least one of the electronic apparatuses as the at least one first sink according to the second selection operation.

9. The apparatus for sharing display frame as claimed in claim 8, wherein the display unit receives a third selection operation corresponding to the first frame corresponding to the second pane, so as to provide options for selecting the electronic apparatuses according to the third selection operation, the display unit receives a fourth selection operation corresponding to at least one of the options of the electronic apparatuses, and the processing unit selects at least one of the electronic apparatuses as the at least one second sink according to the fourth selection operation.

10. The apparatus for sharing display frame as claimed in claim 7, wherein the communication unit establishes a connection with the at least one first sink, the processing unit extracts the first frame corresponding to the first pane, and decodes and encodes the extracted first frame, the communication unit respectively establishes a real-time streaming protocol (RTSP) session with the at least one first sink on the connection, and the processing unit streams content of the first frame corresponding to the first pane to the at least one first sink through the RTSP session by using the communication unit.

11. The apparatus for sharing display frame as claimed in claim 7, wherein the communication unit respectively establishes a user input back channel (UIBC) session with the at least one first sink and the at least one second sink, and the communication unit respectively receives a plurality of control signals through the UIBC session, and the processing unit synchronously controls the at least one corresponding first frame according to the control signals.

12. The apparatus for sharing display frame as claimed in claim 7, wherein the communication unit receives content of at least one second frame of the at least one first sink that is specified to be displayed by the display unit, and the processing unit synchronously displays the at least one second frame on the first frame corresponding to the first pane through the display unit.

* * * * *